United States Patent [19]

Booker

[11] Patent Number: 4,899,583

[45] Date of Patent: Feb. 13, 1990

[54] ATMOSPHERIC SOUNDING APPARATUS

[75] Inventor: D. Ray Booker, Jenks, Okla.

[73] Assignee: Aeromet Inc., Tulsa, Okla.

[21] Appl. No.: 278,714

[22] Filed: Dec. 2, 1988

[51] Int. Cl.[4] ............................................. G01W 1/00
[52] U.S. Cl. .................................................. 73/170 R
[58] Field of Search .............. 73/170 R; 244/149, 150

[56] References Cited

U.S. PATENT DOCUMENTS

| | | | |
|---|---|---|---|
| 2,996,212 | 8/1961 | O'Sullivan, Jr. | 73/170 R |
| 3,004,735 | 10/1961 | Kinard | 73/170 R |
| 3,251,566 | 5/1966 | Chappell | 244/149 |
| 4,394,998 | 7/1983 | Taillet | 73/170 R |

Primary Examiner—Donald O. Woodiel
Attorney, Agent, or Firm—Larson and Taylor

[57] ABSTRACT

An atmospheric sounding unit is provided which is capable of being launched from an aircraft. The unit includes atmospheric sounding instrument such as a rawinsonde for, in operation, providing desired atmospheric soundings; a balloon connected to the sounding instrument; a gas source, e.g., a gas tank, for a lighter-than-air gas; an arrangement for filling the balloon with the gas; and a sensor for sensing the approach of the unit to the Earth and for providing release of the balloon with the sounding instrument connected thereto from the remaining components of the unit when a predetermined approach condition, e.g., contact with water, is sensed. Upon release, the balloon is permitted to ascend and the sounding instrument produces soundings during the ascent of the balloon into the atmosphere. A system of parachutes controls the descent of the unit after the launching thereof from the aircraft.

22 Claims, 4 Drawing Sheets

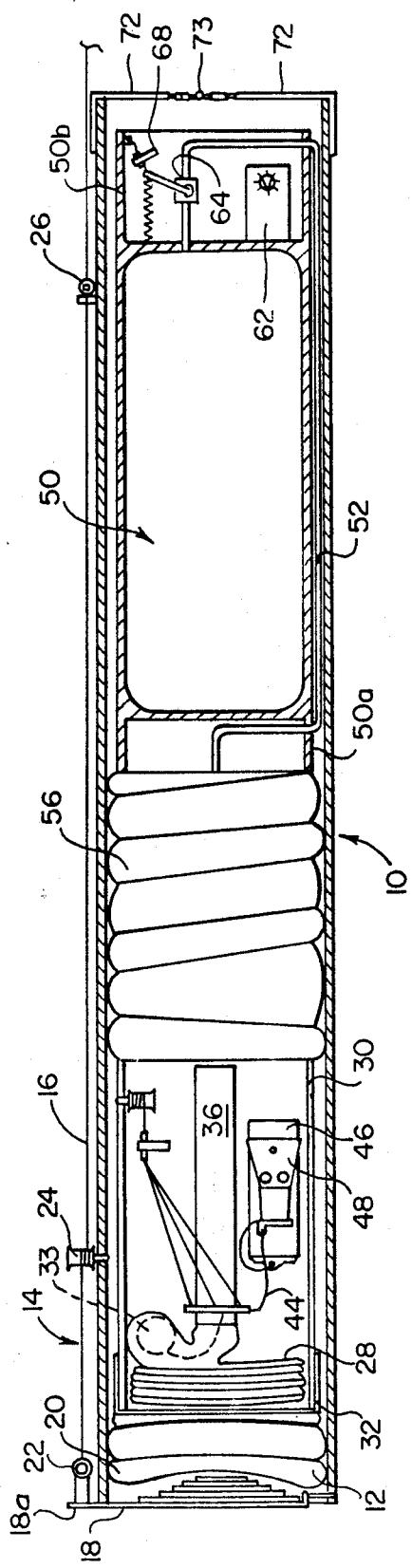
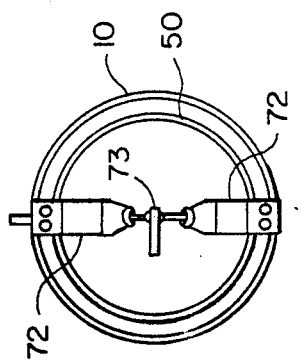
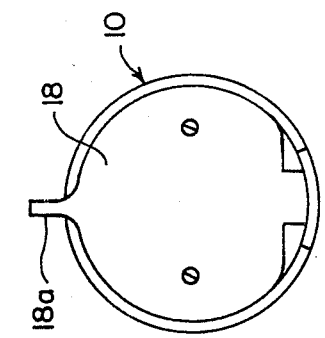

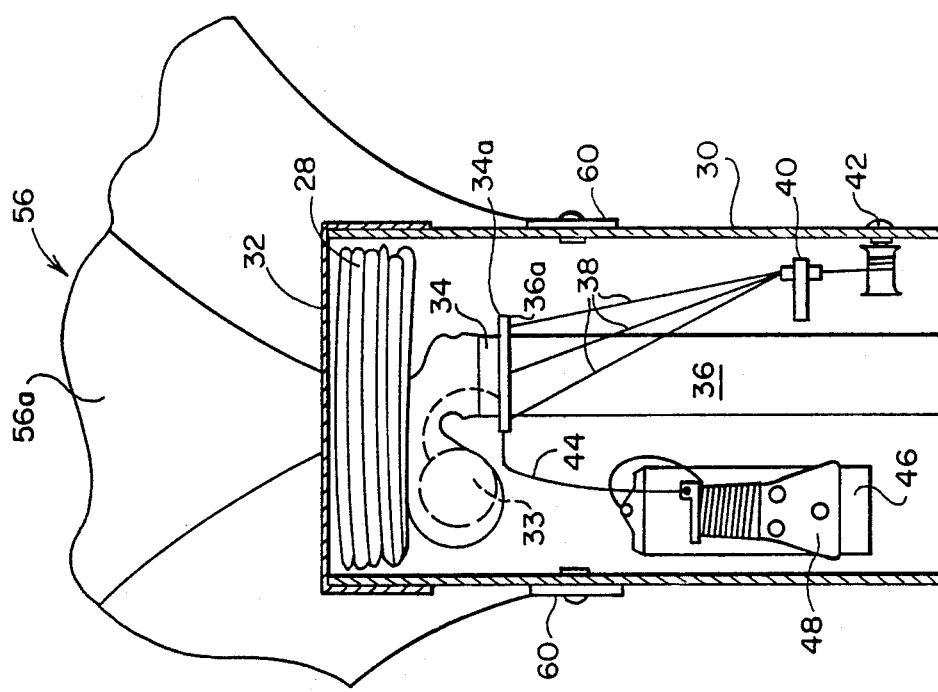
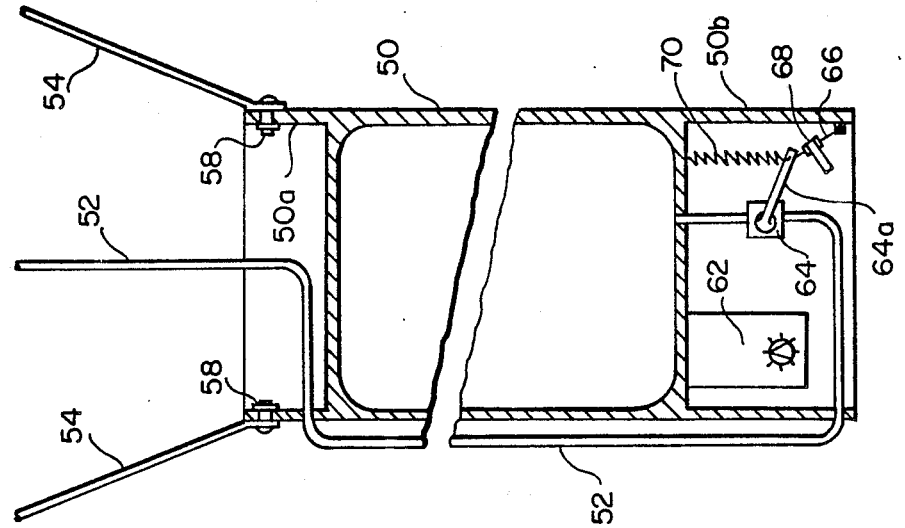

ATMOSPHERIC SOUNDING APPARATUS

FIELD OF THE INVENTION

The present invention relates to atmospheric sounding apparatus for transmitting data regarding atmospheric conditions to a remote station and, more particularly, to sounding apparatus of the type described which provides such data transmission during ascent of an associated lighter-than-air balloon and which is capable of being initially launched from an aircraft.

BACKGROUND OF THE INVENTION

It has been common in the field of meteorology to employ balloons to vertically transport sensing instruments, commonly referred to as rawinsondes, up through the atmosphere so as to measure various atmospheric parameters and transmit data related to these measurements. In accordance with conventional procedures, a balloon is manually inflated with lighter-than-air gas, such as helium or hydrogen, the instrument package is attached thereto, and the balloon and associated instrument package are released to the air. A shelter for inflating the balloon and containing other ground based equipment is normally required. The sensing instrument transmits meteorological data as the balloon rises thereby producing a meteorological sounding used for a variety of weather forecasting and analysis purposes.

Because about 65% of the Earth is covered by water, meteorological sounding stations have been established on islands and aboard some marine vessels. However, meteorological soundings are often required where ships or islands with meteorological sounding stations are not available.

In military applications, there is often an urgent need to obtain meteorological data from land or ocean areas held by unfriendly forces. The deployment of land or sea based personnel into such areas for purposes of providing such meteorological soundings puts human lives at risk and thus there is a need for a method of deployment of such meteorological sounding systems with minimal risk to personnel.

Manned and unmanned aircraft have the capability of flying to points where meteorological soundings are required but present sounding systems generally are not capable of being deployed from aircraft in a manner so as to effectively provide meteorological soundings.

SUMMARY OF THE INVENTION

In accordance with the invention, an atmospheric sounding unit or apparatus is provided which is adapted to be launched or otherwise released from an aircraft, whether manned or unmanned, and which thus enables atmospheric or meteorological data to be gathered in areas that are not presently accessible to conventional sounding systems or that are only accessible with substantial risk to personnel.

In accordance with a preferred embodiment of the invention, an atmospheric sounding unit capable of being launched from an aircraft is provided which comprises atmospheric sounding means (e.g., a rawinsonde or the like) for, in operation, providing atmospheric soundings; a balloon connected to the atmospheric sounding means; a gas source (e.g., a gas storage tank) for a lighter-than-air gas; means for providing filling of the balloon with the lighter-than-air gas from the gas source; and sensor means for sensing the approach of the unit to the Earth and for providing release of the balloon with the sounding means connected thereto from the remaining components of the unit when a predetermined approach condition (e.g., contact with water or descent of the unit to a preselected height above the ground) is sensed, whereby the balloon is permitted to ascend and the sounding means produces soundings during the ascent of the balloon.

Preferably, the balloon and sounding means constitute components of a sounding subassembly and the gas source, filling means and sensor means constitute components of a descent module, and the unit further comprises a main parachute for, when deployed, controlling the descent of the sounding subassembly and descent module.

Advantageously, the unit includes a protective housing within which the main parachute, sounding subassembly and descent module are housed or stored, as well as means for providing release of the main parachute, sounding subassembly and descent module from the protective housing after launching of unit into the atmosphere to thereby provide deployment of the main parachute by the surrounding airstream. The descent module is advantageously secured to the shroud lines of the main parachute and a housing canister of the sounding subassembly is secured to the canopy of the main parachute.

Preferably, the unit also includes a drogue parachute which is secured to the protective housing and which is deployed when the unit is launched so as to control the rate of descent of the unit. In an advantageous embodiment, a deployment means for a drogue parachute is provided which includes a retainer plate detachably mounted on the protective housing at one end thereof; releasible means for releasibly holding the retainer plate in place on the protective housing and for, when released, enabling detachment of said retainer plate from the protective housing; an ejector spring for ejecting the retainer plate from the housing upon release of said releasible means; and a means for releasibly connecting the retainer plate to the drogue parachute (e.g., in the form of a connecting cord or line and a Velcro fastener) such that the retainer plate, when ejected, causes the drogue parachute to be pulled from the protective housing to thereby provide deployment of the drogue parachute.

The means for providing filling of the balloon preferably comprises a control valve for the gas source; releasible means for normally maintaining the control valve in the closed portion thereof; and timing means for providing release of the releasible means after a predetermined time period to thereby provide opening the control valve and to hence provide filling of the balloon from the gas source. It is noted that release of the releasible means can also be based on altitude using an altitude sensor.

Advantageously, a sealing means is provided for sealing off the balloon after filling thereof, this sealing means preferably comprising a stopper member disposed within the balloon and an elongate connector (e.g., cord or line) attached to the stopper member (and forming the connection between the balloon and the sounding means). The arrangement is thus such that the connector is tensioned by the weight of the sounding means when the balloon is released to thus cause the stopper member to be sealingly positioned or seated within the neck of the balloon, to thereby seal off the opening in the balloon and thus seal the lighter-than-air gas within the balloon.

The filling means for the balloon includes a gas line connected between the balloon and the gas source, and the unit preferably further comprises a diffuser chamber connected between the neck of the balloon and the gas line for slowing down the flow of gas to the balloon. The stopper member advantageously comprises an at least partially spherical plug and the sealing means preferably comprises a flange ring including a flange portion mounted on said diffuser chamber so as to be detachable therefrom and a ring portion which serves as a seat for the plug.

It will be understood that the sensor means can take a number of different forms and while in a preferred embodiment intended for use over water, the sensor means comprises a water sensor for sensing contact with water, the sensor means can, for example, comprise an altitude sensor or a radar ground sensing device.

Other features and advantages of the invention will be set forth in, or apparent from, the detailed description of preferred embodiments of the invention which follows.

BRIEF DESCRIPTION OF THE DRAWINGS

FIG. 1 is a side elevational view, partially in cross section, of an atmospheric sounding unit constructed in accordance with a preferred embodiment of the invention;

FIG. 2 is an end elevational view of the unit of FIG. 1;

FIG. 3 is an end elevational view of the unit of FIG. 1, taken from the other end and with parts omitted for purposes of clarity;

FIG. 4 is a side elevational view, partially in cross section, partially broken away and drawn to a larger scale, of the descent module of the unit of FIG. 1;

FIG. 5 is a side elevational view similar to that of FIG. 4 of the sounding (balloon-sonde) subassembly of the unit of FIG. 1.

DESCRIPTION OF THE PREFERRED EMBODIMENTS

Figure 6:
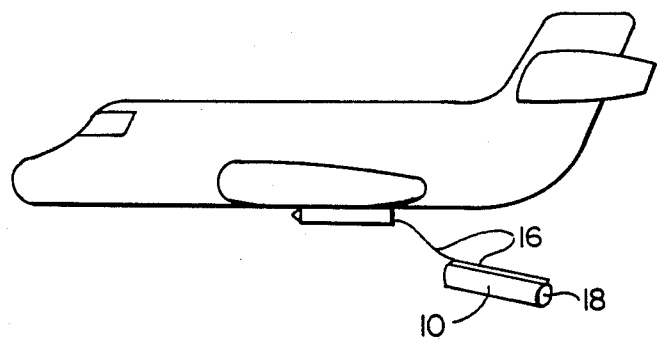
FIGS. 6 to 12 are schematic or representational views, drawn to different scales, showing a series of steps in the deployment of the unit of the invention.

Referring to FIG. 1, a preferred embodiment of the air launched atmospheric sounding system of the invention is shown. The system comprises three basic or primary subassemblies or subsystems; (1) a deployment subsystem; (2) a balloon-sonde or sounding subassembly and (3) a descent module.

Referring first to the deployment subsystem, this includes a hard outer deployment casing or shell 10 which houses the balloon-sonde subassembly and the descent module in addition to the remaining components of the deployment subsystem. The latter includes a drogue parachute 12 which is stowed at one end of casing 10 and a drogue parachute deployment assembly generally denoted 14 and including a deployment lanyard 16 which extends the length of casing 10 along one side thereof, a drag-retainer cover plate 18 (see also FIG. 2) which is releasibly hingedly connected at on edge thereof to casing 10 and includes an outwardly extending projection or nose 18a to which lanyard 16 is connected, and a plate ejector spring 20 disposed adjacent to, and designed, when released, to eject the retainer-drag plate 18 so that plate 18 separates from the casing 10 and pulls the drogue parachute 12 our of casing 10 when plate 81 is ejected. As discussed below, plate 18 is connected to drogue parachute 12 by a line or cord (not shown in FIG. 1) and a "Velcro" or other releasible fastener (not shown).

Lanyard 16 is attached by an eye assembly 22 to projecting nose 18a of plate 18 and extends around a rotatable take-up reel 24 mounted on casing 10. Lanyard 16 is secured at intermediate position near the other end thereof to a remotely actuated cutter ring assembly 26 mounted on casing 10. It is to be understood that actuation of the drogue parachute deployment subassembly and, in particular, release of lanyard 16, can be effected in a number of different ways and that by cutting, or otherwise releasing lanyard 16, the holding force on plate 18 is released and spring 22 is free to force plate 18 to eject and separate from casing 10 and thus cause drogue parachute 12 to also be ejected from the end of casing 10.

The balloon-sonde assembly referred to above includes, as is shown in both FIG. 1 and FIG. 5, a balloon 28 stowed at one end of a storage canister 30 which is closed by a closure cap 32. As can best be seen in FIG. 5, a balloon stopple valve 33 is disposed within balloon 28 and is used to provide sealing thereof, after inflation, as explained below. A ring flange member 34 received in the inflation opening in the neck of the balloon 28 includes flanges 34a which mate with the flanges 36a of a diffuser member 36 mounted within canister 30. The connection between these mating flanges 34a, 36a is maintained by ring flange hold down cords or wires 38 connected through a pyrotechnically actuated cord cutter 40 to a take-up reel rotatably mounted inside of canister 30. Balloon stopple valve 33 is connected by a cord or lanyard 44 to a rawinsonde device 46 through a balloon lanyard storage card 48 about which lanyard 44 is wrapped during storage and which serves the purpose of slowly paying out the cord or lanyard 44 as soon as the balloon-sonde is released from the storage canister 30. The rawinsonde 46 is a conventional sonde used in measuring temperature, pressure, humidity and wind data and transmitting the same to a remote station or stations. It will be appreciated that the data gathered is up to the user of the system and different sonde devices or other sensing devices can be used depending upon the application to which the system is put.

The descent module, which is shown in FIGS. 1 and 4 includes a gas storage tank 50 disposed within casing 10 and including a flexible gas line or tube 52 connected to balloon storage canister 30 and, more particularly, connected to, and in communication with, diffuser tube 36. The shrouds 54 of a main parachute 56 (FIG. 1) are secured by suitable connectors 58 to an extension or extended portion 50a at one end of tank 50, whereas, referring again to FIG. 5, the canopy 56a of main parachute 56 is connected by suitable connectors 60 to balloon canister 30. An extension 50b of tank 50 at the other end thereof serves to house a timing and control device 62 as well as a gas release valve 64 connected in gas line 52. Valve 64 includes an actuator lever 64a held in the inoperative position thereof by a wire or cord 66 secured to the inner wall of extension 50b and having a pyrotechnically actuated cord cutter 68 connected thereto or otherwise incorporated therein. A spring 70 biases actuator lever 64a towards the operative or unactuated position thereof so that when cord 66 is cut, valve 64 is actuated.

The descent module including gas tank 50 is held in place within casing 10 by retainer straps 72 which are shown in FIGS. 1 and 3. These straps incorporate a pyrotechnically actuated cord cutter 73 which, when actuated, cuts the connection between the straps 72 to provide release of tank 50 from casing 10.

Timing and control device or unit 62 basically comprises a series of timer circuits (not shown) which generate signals in the sequence described below to provide remote actuation of the various pyrotechnically actuated cord cutter devices mentioned above, as is described in more detail hereinafter. The timing circuit used to control release of the main parachute 56 preferably comprises a plurality of different valued resistors (not shown) which are selectively switched into the timing circuit so as to control the altitude at which the main parachute 56 opens. Such timing circuits are conventional and the unit 62 can be implemented using a number of different conventional circuits to perform the timing control sequence set forth below. It is also noted that unit 62 can also comprise an altitude sensor which provides remote actuation of some or all of the cord cutter devices or other release devices.

Considering the operation, in use, of the system shown in FIGS. 1 to 5 and referring also to FIGS. 6 to 12 which show various stages in the operation, a number of options are available for launching the deployment casing 10 from an aircraft. For example, the casing 10 may be manually ejected from an opening such as a window or door in the aircraft. The deployment casing 10 can also be ejected from an appropriately constructed tube (not shown) through the fuselage of an aircraft. In the embodiment illustrated, the deployment casing 10 is dropped or ejected from a mount M on an aircraft A using a suitable remotely operated release mechanism (not shown). For example, deployment casing 10 may be outfitted with attachment rings (not shown) and suspended from a "bomb rack" type of release mechanism secured to the exterior or bomb bay of the aircraft for providing a remotely controlled release operation.

Figure 7:
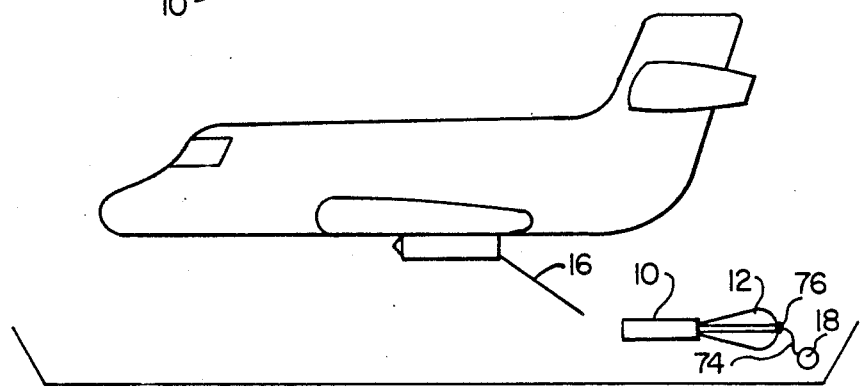
Figure 8:
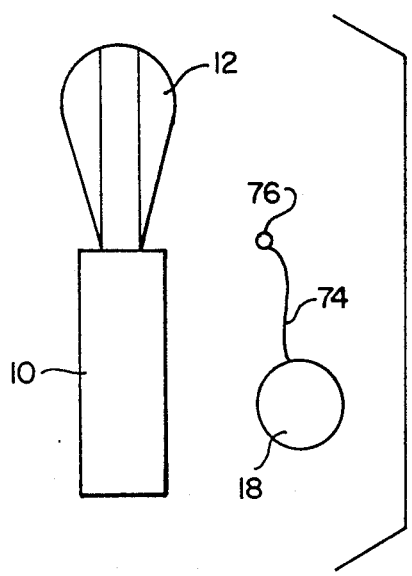

Lanyard 16, which, in the illustrated embodiment, is adapted to be attached to the aircraft A, and to the deployment system as described above in connection with FIG. 1, is used to initiate the deployment process. In particular, the tug exerted on lanyard 16 when the casing 10 is dropped or ejected from the aircraft as shown in FIG. 6 causes cutting of lanyard 16 to thereby release the retainer-drag plate 81 as described above. As a consequence, ejector spring 20 is permitted to eject plate 18 from casing 10 and the aerodynamic drag on the drag plate 18 then pulls the drogue parachute 12 out of casing 10 as shown in FIG. 7. As noted above, the drag plate 18 is attached to drogue parachute 12 by a cord, indicated at 74 in FIG. 7, and a "Velcro" or other releasible connector or fastener, indicated at 76 in FIG. 7. Thus, after the drogue parachute 12 is pulled out of casing 10, the drag plate 18 separates therefrom at connection 76, as is illustrated in FIG. 8.

A triggering mechanism (not shown), which can, e.g., comprise a microswitch actuated by ejection of drag plate 18, signals the electronic process control timer unit 62 to actuate or initialize the timer circuitry. Timer unit 62, as stated above, controls a subsequent series of operational events when actuated, and turns on the rawinsonde power source.

As stated above, the descent module including gas storage tank 50 is held in place inside of the deployment casing 10 by retainer straps 72 held together by wire that passes through a pyrotechnic wire cutter 73. After an appropriate delay time from initialization, as timed out by timer unit 62, the electronic timer and related control circuitry of unit 62 activate the pyrotechnic wire cutter 73, to thereby sever the wire holding straps 72 together and thus release the descent module from casing 10.

Figure 9:
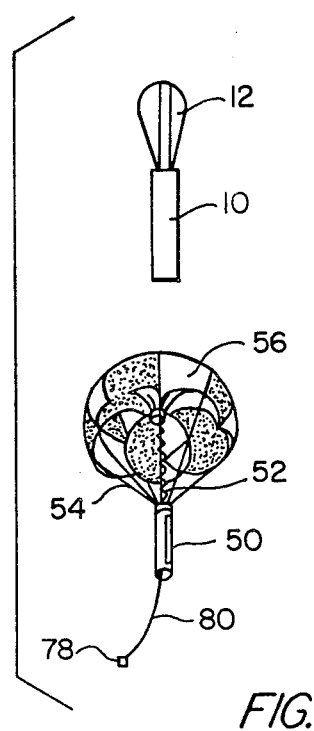

The retarding drag force produced by the drogue parachute 10 serves in enhancing separation of the descent module (including tank 50) and the balloon-sonde assembly from the deployment casing 10. When the descent module slides out of the deployment casing 10, the main parachute 56 is exposed to the surrounding or adjacent airstream, thereby causing deployment of the parachute 56. The main parachute 56 slows the descent of the descent module to about 1000 feet per minute. This deceleration also causes a water sensor, indicated at 78 and connected by a cord 80 to gas storage tank 50, to be deployed from the bottom of the module as indicated in FIG. 9.

Water sensor 50 can take a number of conventional forms and preferably comprises a pair of conductors (not shown) printed on a printed circuit board (not shown). Thus, when the printed circuit is immersed in a conductive fluid, such as water, a circuit is completed through the conductors back, through conductor wires or other electrical connections (not shown) provided within cord 80, to the control circuitry of control and timer unit 62. In a specific embodiment, the water sensor 78 hangs about fifty feet below the gas storage tank 50 of the descent module in order to detect the presence of the sea in time to provide separation of the balloon-sonde subassembly before the latter descends into the sea. It is to be understood that sensor 78 can also comprise an altimeter device, an altitude sensing switch, radar altimeter ground sensing device or any other device capable of sensing approach of the sensor to and/or the arrival of the sensor at or near ground level, and is not limited to water sensing.

An antenna wire 82 (see FIG. 12) for the VLF/Omega receiver of the rawinsonde 46 is attached to the abovementioned conductor wires of the water sensor 78 and thus is stretched out at the same time as the water sensor conductor wires. The deployment of the VLF antenna enables the rawinsonde 46 to begin accumulating data for computation of wind speed and direction during descent. The sonde transmitter is also activated at this time and the transmission of data is initiated. The fully deployed main chute 56, water sensor 78 and antenna wire (carried by cord 80) are shown in FIG. 10.

At this time, the timer unit 62 of the process control module also activates a further pyrotechnic cutter 68 to sever retaining wire or cord 66, thus releasing spring 70 and actuating gas control valve 64 through actuation of valve control lever 64a. As noted above, this function could also be controlled by an altitude sensor. Thus, gas is permitted to flow from tank 50 upwardly through the gas tube 52 and the diffuser chamber 36 and into the balloon 28. Diffuser chamber 36 serves to slow down the velocity of gas supplied to the balloon 28 to thereby prevent damage to the walls of the balloon 28, as well as to provide an interface with the balloon.

Figure 10:
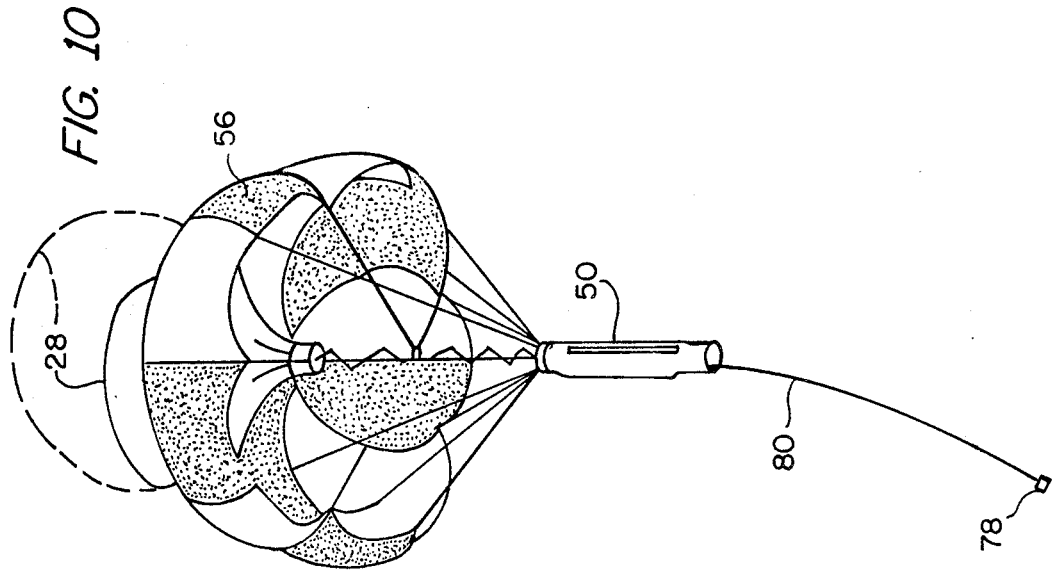

The balloon 28, which is packed in balloon storage canister 30 as described above, is mounted in the top of the parachute canopy 56 as indicated in FIG. 10, begins to inflate in response to the supply of gas thereto, the balloon 28 being protected from the airstream by the main parachute canopy 56. The fully inflated balloon is also indicated, in dashed lines, in FIG. 10. The descent module including storage tank 50 can continue descent for several thousand feet after the balloon inflation process is completed.

As described above, the water sensor 78 comprises a pair of conductors provided on a printed circuit board and when the sensor 78 contacts and enters the sea (or another conductive fluid) an electrical circuit is completed between the conductors. The water sensor 78 is constructed so that the aforementioned conductors are relatively widely separated so that rain or moisture from clouds cannot cause conduction between the conductors. The water sensor 78 can also be adjusted to actuate when immersed in sea water and not in fresh water to achieve the same result. When an electrical circuit is completed between the conductors by sea water when sensor 78 drops into the sea, this is detected by the control and timer unit 62 which is connected to sensor 78. Unit 62 then activates the pyrotechnic cutter 40 which is connected to the wires 3 which retain the ring flange member 34 in place on diffuser chamber or tube 36 to thereby release member 34, and thus balloon 28, from diffuser chamber 36. As the balloon 28 begins to rise, the lanyard 44 is tightened and pulls the stopple plug 33 (shown in FIG. 5 and FIG. 12) down into the neck of the ring flange 34, thus sealing the inflation gas within the balloon 32 and thereby providing an anchor point for the lanyard 44 which supports the sonde 46.

Figure 11:
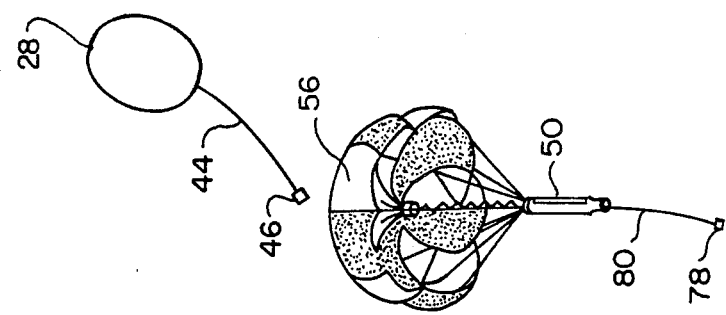

As the balloon 28 rises, the lanyard 44 leading to the sonde 46 is further tightened so as to provide lifting of the sonde 46 from the storage canister or container 30. The balloon 28 and sonde 46 then clears the main parachute canopy 56 as shown in FIG. 11 and begins rising further. The lanyard 44 unwinds from the lanyard storage card 48 (FIG. 5) thereby permitting the lanyard to extend to the full length thereof, which is about 50 feet in a specific preferred embodiment.

Figure 12:
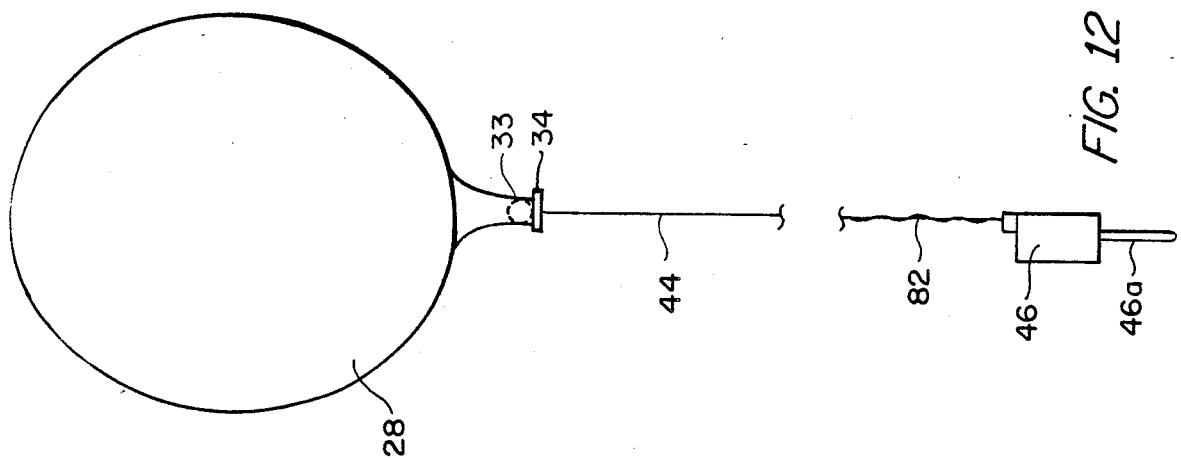

As soon as the sonde 46 is lifted from its storage area within storage canister 30, the sonde 46 is separated from the associated VLF/Omega antenna (not shown) which, as indicated above, is part of the water sensor lanyard 78. However, sonde 46 remains connected a navigation antenna 82 (FIG. 12) which is part of the lanyard 44 connected to the balloon 28. Thus, sonde 46 continues to receive VLF/Omega signals for enabling computation of wind parameters as soon as balloon lanyard 44 is fully extended. As illustrated in FIG. 12, sonde 46 also includes a further antenna 46a which is an automatically erecting telemetry antenna. The balloon 28, sonde 46 and lanyard 44 are shown in FIG. 12 in the final ascent configuration.

As discussed above, sonde 46 senses temperature, humidity and/or other atmospheric data and transmits that data as balloon 28 rises, thus completing an atmospheric sounding. The upward sounding continues until the balloon 28 bursts and can, if desired, continue as the sonde 46 falls if such data is of interest to the user of the system.

Although present invention has been described relative to exemplary embodiments thereof, it will be understood by those skilled in the art that variations and modifications can be effected in these exemplary embodiments without departing from the scope and spirit of the invention.

I claim:

1. An atmospheric sounding unit capable of being launched from an aircraft, said unit comprising:
   atmospheric sounding means for, in operation, providing atmospheric soundings;
   a balloon connected to said sounding means;
   a gas source for a lighter-than-air gas;
   means for providing filling of said balloon with the lighter-than-air gas from said gas source; and
   sensor means for sensing the approach of the unit to the Earth and for providing release of said balloon with said sounding means connected thereto from the remaining components of the unit when a predetermined approach condition is sensed whereby said balloon is permitted to ascend and said sounding means produces soundings during the ascent of the balloon.

2. An atmospheric sounding unit as claimed in claim 1 wherein said balloon and said sounding means constitute components of a sounding subassembly and said gas source, said filling means and said sensor means constitute components of a descent module, said unit further comprising a main parachute for, when deployed, controlling the descent of said sounding subassembly and said descent module.

3. An atmospheric sounding unit as claimed in claim 2 further comprising a protective housing within which said main parachute, said sounding subassembly and said descent module are stored and means for providing release of said main parachute, said sounding subassembly and said descent module from said protective housing after launching of unit into the atmosphere to thereby provide deployment of said parachute.

4. An atmospheric sounding unit as claimed in claim 3 wherein said main parachute includes a canopy and shroud lines, said descent module being secured to said shroud lines and said unit further comprising a canister, secured to the canopy of said main parachute, for housing said sounding subassembly.

5. An atmospheric sounding unit as claimed in claim 3 further comprising a drogue parachute which is secured to said protective housing and which is deployed when said unit is launched.

6. An atmospheric sounding unit as claimed in claim 5 further comprising deployment means for said drogue parachute including a retainer plate detachably mounted on said protective housing at one end of said protective housing; releasible means for releasibly holding said retainer plate in place on said protective housing and for, when released, enabling detachment of said retainer plate from said protective housing; an ejector spring for ejecting said retainer plate from said housing upon release of said releasible means; and means for releasibly connecting said retainer plate to said drogue parachute such that the retainer plate, when ejected, causes the drogue parachute to be pulled from said protective housing to provide deployment of the drogue parachute.

7. An atmospheric sounding unit as claimed in claim 1 wherein said means for providing filling of said balloon comprises a control valve for said gas source; releasible means for normally maintaining said control valve in the closed portion thereof; and means responsive to a selected parameter for providing release of said releasible means to thereby provide opening said control valve and to hence provide filling of said balloon from said source.

8. An atmospheric sounding unit as claimed in claim 7 wherein said parameter responsive means comprises a timer unit which provides release of said releasible means after a predetermined time period.

9. An atmospheric sounding unit as claimed in claim 8 wherein said filling means includes a gas line connected between the balloon and the gas source, said unit further comprising a diffuser chamber connected between the neck of said balloon and said gas line for slowing down the flow of gas to the balloon.

10. An atmospheric sounding unit as claimed in claim 9 wherein stopper member comprises an at least partially spherical plug and said sealing means comprises a flange ring including a flange portion releasibly mounted on said diffuser chamber and a ring portion which serves as a seat for said plug.

11. An atmospheric sounding unit as claimed in claim 7 wherein said parameter responsive means comprises an altitude sensor means which provides release of said releasible means at a predetermined altitude.

12. An atmospheric sounding unit as claimed in claim 7 further comprising sealing means for providing sealing off of the balloon after filling thereof, said sealing means comprising a stopper member disposed within said balloon and an elongate connector attached to said stopper member and forming the connection between said balloon and said sounding means such that the connector is tensioned by the weight of said sounding means when said balloon is released to thus cause said stopper member to be sealingly positioned within the neck of the balloon, thereby to seal off the opening in the balloon and thus seal the lighter-than-air gas within the balloon.

13. An atmospheric sounding unit as claimed in claim 1 wherein said sensor means comprises a water sensor for sensing contact with water.

14. An atmospheric sounding unit as claimed in claim 1 wherein said sensor means comprises an altitude sensor.

15. An atmospheric sounding unit as claimed in claim 1 wherein said sensor means comprises a radar ground sensing device.

16. An atmospheric sounding apparatus comprising:
a sounding unit;
a balloon for carrying said sounding unit aloft so that said sounding unit provides sounding during the ascent of the balloon;
a source of lighter-than-air gas;
means for filling said balloon with lighter-than-air gas from said source;
means for providing release of said balloon after filling thereof so as to permit the balloon to rise;
and sealing means for providing sealing off of the balloon after filling thereof;
said sealing means comprising a stopper member disposed within said balloon and an elongate connector attached to said stopper member and to a weight such that the connector is tensioned by said weight when said balloon is released to cause said stopper member to be sealingly positioned within the neck of balloon, thereby to seal off the opening in the balloon and thus seal the lighter-than-air gas within the balloon.

17. An atmospheric sounding apparatus as claimed in claim 16 wherein said stopper member comprises an at least partially spherical plug and said sealing means further comprises a flange ring disposed within the neck of the balloon and including a ring portion which serves as a seat for said at least partially spherical plug.

18. An atmospheric sounding apparatus as claimed in claim 17 wherein said weight comprises a rawinsonde.

19. An atmospheric sounding apparatus as claimed in claim 16 further comprising a parachute including a parachute canopy and a canister secured to the center of said canopy for housing said balloon, the weight, and said balloon sealing means.

20. An atmospheric sounding apparatus as claimed in claim 16 further comprising a cylindrical housing for the components of the apparatus, and a drogue parachute, contained within the housing and secured to one end of said housing, for, when deployed, controlling the descent of the housing.

21. An air-launched unit for providing meteorological data to a remote monitoring station, said unit comprising:
a protective deployment housing;
a parachute system, housed within said housing and deployable from the housing, for, when deployed, controlling the descent of the unit after release thereof from an aircraft;
a balloon housed within said housing and releasable therefrom;
sensor and transmitter means, connected to said balloon and releasable from said housing therewith, for sensing at least one parameter in the environment of the balloon and for transmitting a signal in accordance therewith;
a lighter-than-air gas storage tank housed within said housing from which said balloon is filled with a lighter-than-air gas during the descent of said unit;
sensing means for sensing the approach of the unit to the Earth and for producing an output signal when a predetermined approach condition is sensed;
control means, responsive to said sensing means for, responsive to said output signal from said sensing means, controlling releasing of said balloon and the sensor and transmitter means connected thereto from the remaining components of the unit so that the sensor and transmitter means is able to transmit a said signal during the ascent of said balloon.

22. A unit as claimed in claim 21 wherein said parachute system comprises a main parachute including a canopy and shroud lines, said gas tank being connected to said shroud lines and said unit further comprising a canister which is secured to the canopy of the main parachute and in which said balloon and said sensor and transmitter means are housed, said unit further comprising a holding means, including a plurality of holding cords, for releasibly holding the balloon in place, and remotely controlled pyrotechnic cord cutting means for, responsive to said control means, cutting said cords to provide release of said balloon.

* * * * *